US012722531B2

(12) United States Patent
Nakayama

(10) Patent No.: US 12,722,531 B2
(45) Date of Patent: Sep. 1, 2026

(54) LOWER BODY STRUCTURE OF VEHICLE

(71) Applicant: Mazda Motor Corporation, Hiroshima (JP)

(72) Inventor: Shota Nakayama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 571 days.

(21) Appl. No.: 18/126,494

(22) Filed: Mar. 27, 2023

(65) Prior Publication Data

US 2024/0239244 A1 Jul. 18, 2024

(30) Foreign Application Priority Data

May 16, 2022 (JP) ................................ 2022-080049

(51) Int. Cl.

| | |
|---|---|
| ***B60N 2/015*** | (2006.01) |
| ***B60K 15/063*** | (2006.01) |
| ***B60K 15/067*** | (2006.01) |
| ***B62D 21/02*** | (2006.01) |
| ***B62D 25/20*** | (2006.01) |

(52) U.S. Cl.

CPC ............ *B60N 2/015* (2013.01); *B60K 15/067* (2013.01); *B62D 21/02* (2013.01); *B62D 25/2009* (2013.01); *B60K 2015/0631* (2013.01)

(58) Field of Classification Search

CPC .......... B60N 2/15; B62D 21/02; B62D 21/09; B62D 25/2009; B62D 25/2027; B60K 15/067; B60K 2015/0631; B60K 1/04

USPC ........ 296/63, 65.03, 64, 65.13, 65.01, 65.11, 296/193.07, 187.08, 204; 280/795, 796

See application file for complete search history.

(56) References Cited

U.S. PATENT DOCUMENTS

| | | | | |
|---|---|---|---|---|
| 7,270,365 B2 * | 9/2007 | Suzuki | ................. | B62D 25/087 296/37.2 |
| 7,487,998 B2 * | 2/2009 | Toyota | ................. | B60K 15/063 280/834 |
| 8,672,359 B2 * | 3/2014 | Ohashi | .................. | B62D 25/20 280/834 |

(Continued)

FOREIGN PATENT DOCUMENTS

| | | | |
|---|---|---|---|
| JP | H0585422 A * | 4/1993 | ............. B62D 25/20 |
| JP | 2012-245878 A | 12/2012 | |

OTHER PUBLICATIONS

Translation of JPH0585422A (Year: 1993).*

*Primary Examiner* — Amy R Weisberg
*Assistant Examiner* — Veronica M Condo
(74) *Attorney, Agent, or Firm* — XSENSUS LLP

(57) ABSTRACT

A lower body structure of a vehicle includes: a left and right pair of left seat rails and a left and right pair of right seat rails configured to make left and right seats of a second-row seat independently slidable; a first cross member including securing portions to which the left seat rails and the right seat rails are secured; a second cross member disposed apart from the first cross member in a vehicle fore-and-aft direction; and a first coupling member that couples the first cross member and the second cross member to each other in the vehicle fore-and-aft direction. The first coupling member is located between the securing portion located on a left side of the right seat rails and the securing portion located on a right side of the left seat rails in a vehicle width direction.

18 Claims, 8 Drawing Sheets

(56) References Cited

U.S. PATENT DOCUMENTS

| | | | | |
|---|---|---|---|---|
| 8,985,666 | B2 * | 3/2015 | Maruyama | B60N 2/015 296/65.13 |
| 9,259,998 | B1 * | 2/2016 | Leanza | B62D 25/20 |
| 9,956,861 | B2 * | 5/2018 | Nomura | B62D 21/07 |
| 10,486,515 | B2 * | 11/2019 | Saeki | B60N 2/005 |
| 11,167,800 | B2 * | 11/2021 | Aghssa | B62D 21/152 |
| 11,285,796 | B2 * | 3/2022 | Choi | B60K 1/04 |
| 11,548,553 | B2 * | 1/2023 | Ajisaka | B62D 21/157 |
| 11,807,306 | B2 * | 11/2023 | Kim | B60K 1/04 |
| 11,952,047 | B2 * | 4/2024 | Kang | B62D 25/18 |
| 12,221,171 | B2 * | 2/2025 | Hayakawa | B62D 43/10 |
| 2021/0061370 | A1 * | 3/2021 | Ebisumoto | B62D 25/20 |
| 2022/0105991 | A1 * | 4/2022 | Kim | B62D 25/20 |
| 2023/0406415 | A1 * | 12/2023 | Erber | B60K 1/04 |

* cited by examiner

LOWER BODY STRUCTURE OF VEHICLE

CROSS-REFERENCE TO RELATED APPLICATION

The present application claims priority to Japanese Patent Application 2022-080049, filed May 16, 2022, the entire contents of which are incorporated herein by reference.

BACKGROUND

Field

The present disclosure relates to a lower body structure of a vehicle including a first-row seat and a second-row seat from the front of the vehicle.

Description of the Related Art

In general, a structure of transmitting vibration input from seat attachment brackets (so-called seat brackets) to a cross member extending in a vehicle width direction has been known (see patent document 1).

Incidentally, in the case of a vehicle including a wide floor panel and having a large vehicle weight and a high vehicle size class, vibration is input to a cross member from a second-row seat in a vehicle vertical direction, and such a behavior occurs that the cross member may be vertically bent and deformed, which may degrade ride comfort.

In order to solve such a problem, rigidity may be improved by increasing a cross section of the cross member, for example. However, this case leads to an increase in the cost and mass.

PRIOR ART DOCUMENTS

Patent Documents

[Patent Document 1] JP-A-2012-245878

SUMMARY

In view of this, an object of the disclosure is to provide a lower body structure of a vehicle in which vertical vibration input to a cross member at a position of seat rails of a second-row seat is transmitted to an adjacent cross member so as to improve ride comfort without increasing the cost and mass.

Means for Solving the Problem

The disclosure provides a lower body structure of a vehicle including a first-row seat and a second-row seat from the front of the vehicle, the lower body structure of the vehicle being characterized by: a left and right pair of left seat rails and a left and right pair of right seat rails configured to make left and right seats of the second-row seat independently slidable; a first cross member including securing portions to which the left seat rails and the right seat rails are secured; a second cross member disposed apart from the first cross member in a vehicle fore-and-aft direction; and a first coupling member that couples the first cross member and the second cross member to each other in the vehicle fore-and-aft direction, the first coupling member being located between the securing portion located on a left side of the right seat rails and the securing portion located on a right side of the left seat rails in a vehicle width direction.

According to the disclosure, a portion where vibration input from the seat rails of the second-row seat is largest is coupled to the second cross member by the first coupling member, so that vibration from the second-row seat can be efficiently transmitted to the second cross member.

That is, without increasing the cost and mass, vertical vibration input to a cross member at a position of the seat rails of the second-row seat (the first cross member) can be transmitted to an adjacent cross member (the second cross member) so as to improve ride comfort.

As an aspect of the disclosure, the second-row seat may be a divided seat divided into left and right seats at asymmetrical left and right positions, and the first coupling member may be located on an outer side of a vehicle-width-direction center in the vehicle width direction whereas the second coupling member may be disposed at a position laterally symmetrical with the first coupling member across the vehicle-width-direction center.

According to the disclosure, provision of the second coupling member increases load transmission routes so that rigidity can be improved. Moreover, in a general mode of the seat rails of the second-row seat, vibration can be transmitted most efficiently.

As an aspect of the disclosure, the first coupling member may couple lower surfaces of the first cross member and the second cross member to each other in the vehicle fore-and-aft direction.

According to the disclosure, a load from a ridgeline of the first cross member can be reliably transmitted to a ridgeline of the second cross member so as to disperse the load.

As an aspect of the disclosure, the first coupling member may include a tank attachment portion for a fuel tank.

According to the disclosure, the fuel tank can be attached without need to provide additional tank attachment brackets. Moreover, the structure is adaptable to variation. That is, in the case of a plug-in hybrid vehicle (plug-in hybrid electric vehicle; so-called PHEV), a fuel tank is small, and in this case, the tank attachment portion of the first coupling member may be made to support the fuel tank. Meanwhile, in the case of a vehicle driven by an internal combustion engine, a fuel tank is large, and in this case, the second cross member may be made to support the fuel tank.

As an aspect of the disclosure, the fuel tank may be attached to the tank attachment portion with a tank band, a tank band securing portion located on an end of the tank band may include a protruding piece that is bent from the tank band securing portion and extends upward, and the first coupling member may include, in the vicinity of the tank attachment portion, an inclined portion that is inclined more inward toward the rear or inclined more outward toward the rear so as to restrict rotation of the protruding piece relative to the first coupling member.

According to the disclosure, the inclined portion of the first coupling member restricts the protruding piece, so that rotation of the tank band securing portion can be stopped.

As an aspect of the disclosure, the first coupling member may include a first portion at a position flush with the lower surface of the first cross member, and a second portion extending from a rear end of the first portion more upward toward the rear.

According to the disclosure, as compared with a structure in which the first coupling member directly couples the lower surfaces of the first cross member and the second cross member to each other, the first coupling member can be made to have a larger cross-sectional area so as to secure rigidity of the first coupling member.

As an aspect of the disclosure, the first coupling member may include a bead protruding downward and extending in the vehicle fore-and-aft direction in the first portion.

According to the disclosure, provision of the bead makes it possible to secure rigidity of the first coupling member, and also, the bead protruding downward can function as drainage.

Advantages

The disclosure produces an effect that without increasing the cost and mass, vertical vibration input to the cross member at the position of the seat rails of the second-row seat can be transmitted to the adjacent cross member so as to improve ride comfort.

BRIEF DESCRIPTION OF THE DRAWINGS

The scope of the present disclosure is best understood from the following detailed description of exemplary embodiments when read in conjunction with the accompanying drawings.

DETAILED DESCRIPTION

The object of providing a lower body structure of a vehicle in which vertical vibration input to a cross member at a position of seat rails of a second-row seat is transmitted to an adjacent cross member so as to improve ride comfort without increasing the cost and mass has been achieved by the following configuration: a lower body structure of a vehicle including a first-row seat and a second-row seat from the front of the vehicle, the lower body structure including: a left and right pair of left seat rails and a left and right pair of right seat rails configured to make left and right seats of the second-row seat independently slidable; a first cross member including securing portions to which the left seat rails and the right seat rails are secured; a second cross member disposed apart from the first cross member in a vehicle fore-and-aft direction; and a first coupling member that couples the first cross member and the second cross member to each other in the vehicle fore-and-aft direction, with the first coupling member being located between the securing portion located on a left side of the right seat rails and the securing portion located on a right side of the left seat rails in a vehicle width direction.

[Example]

One example of the disclosure will be hereinafter described in detail based on the drawings.

Figure 1:
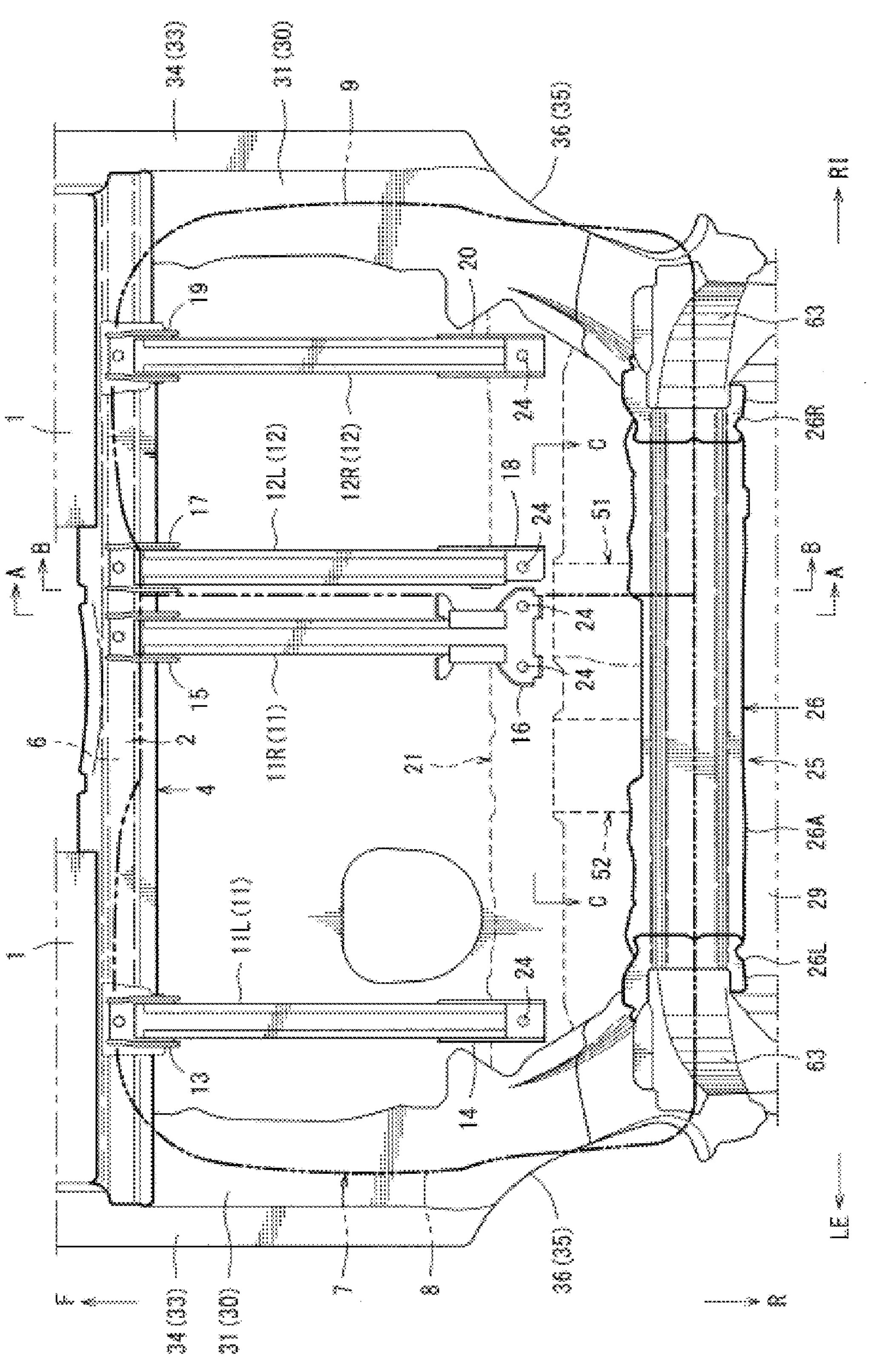
FIG. 1 is a plan view of a lower body structure of a vehicle.
Figure 2:
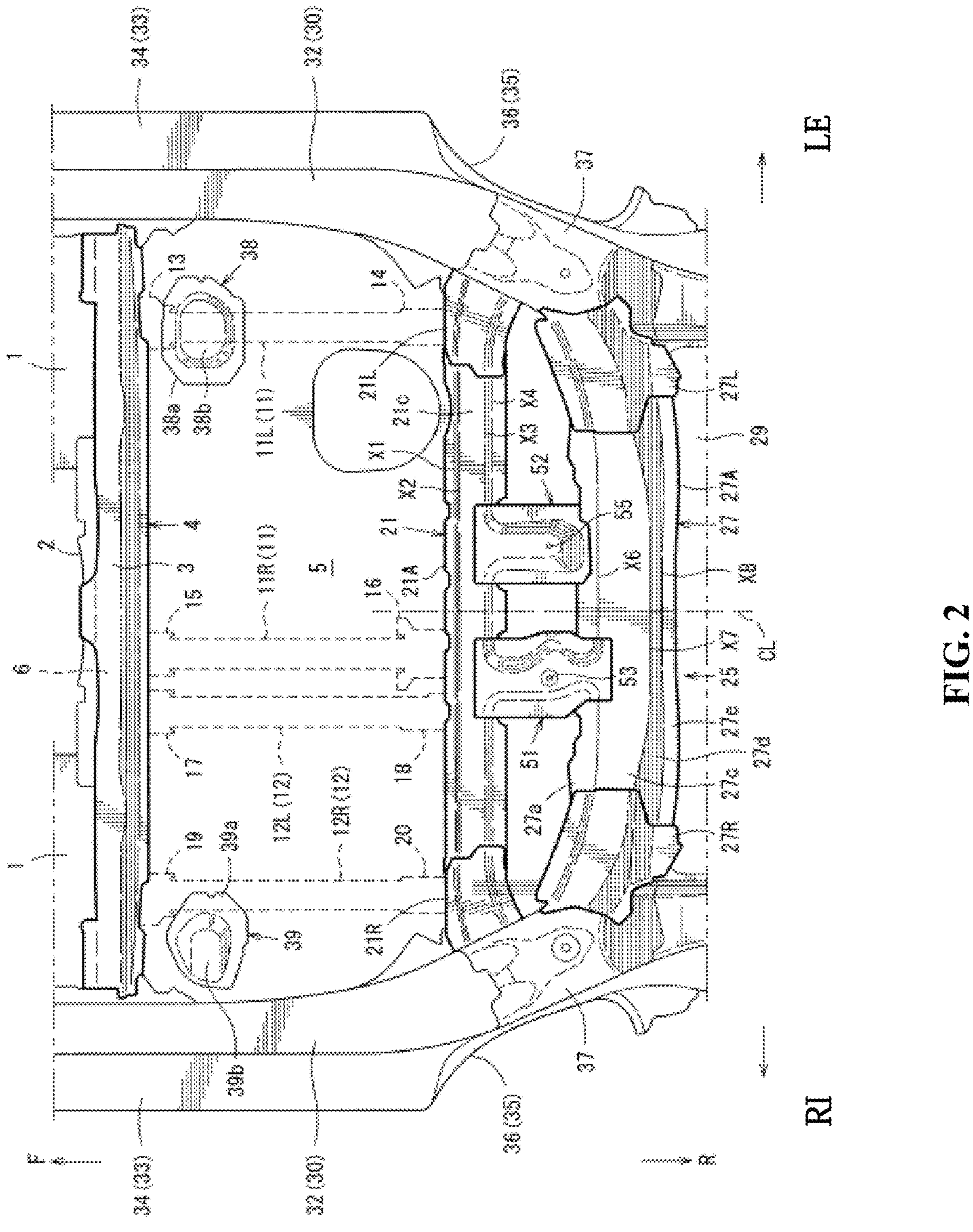
FIG. 2 is a bottom view of FIG. 1.
Figure 3:
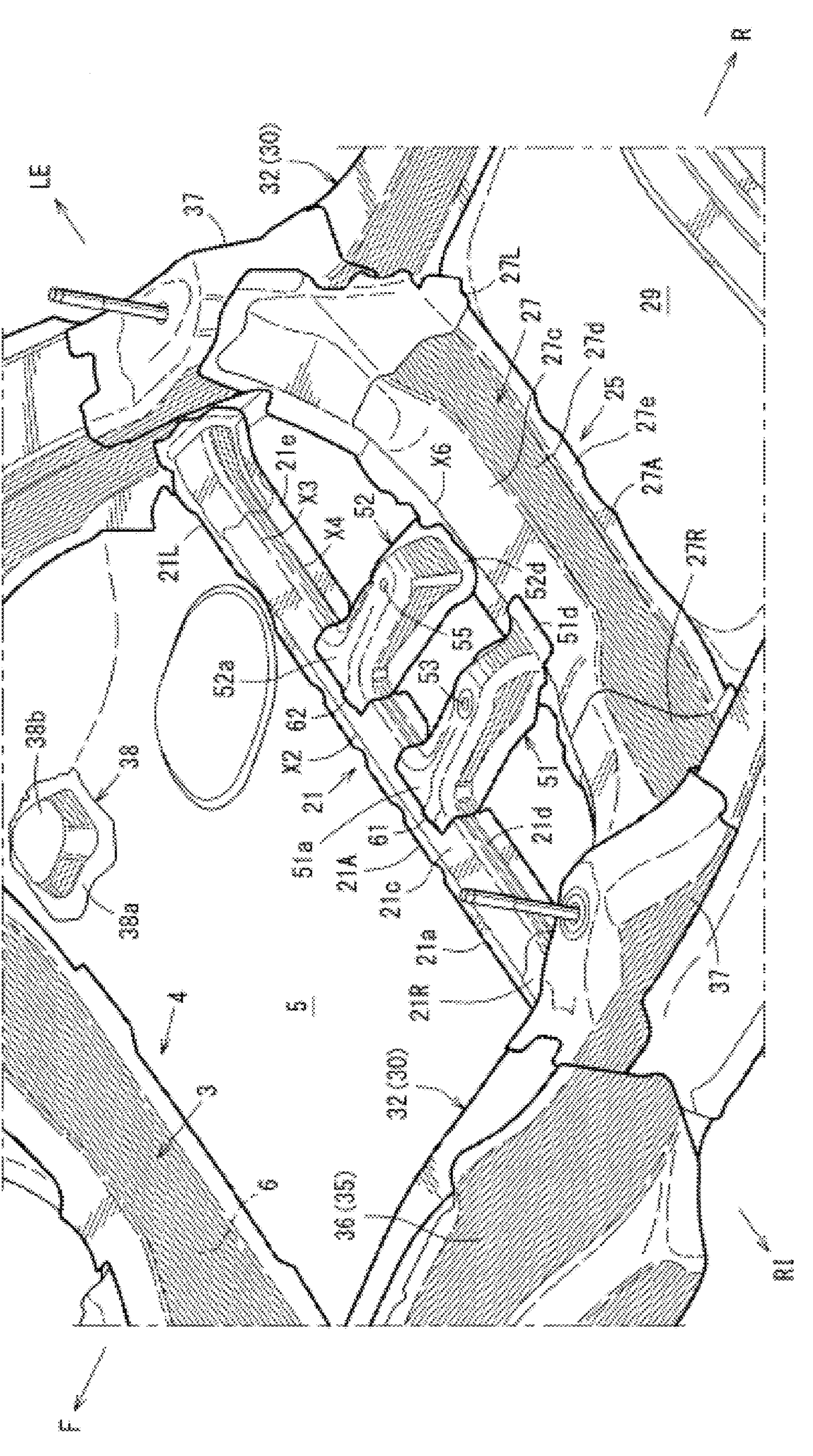
FIG. 3 is a bottom perspective view of the lower body structure of the vehicle.
Figure 4:
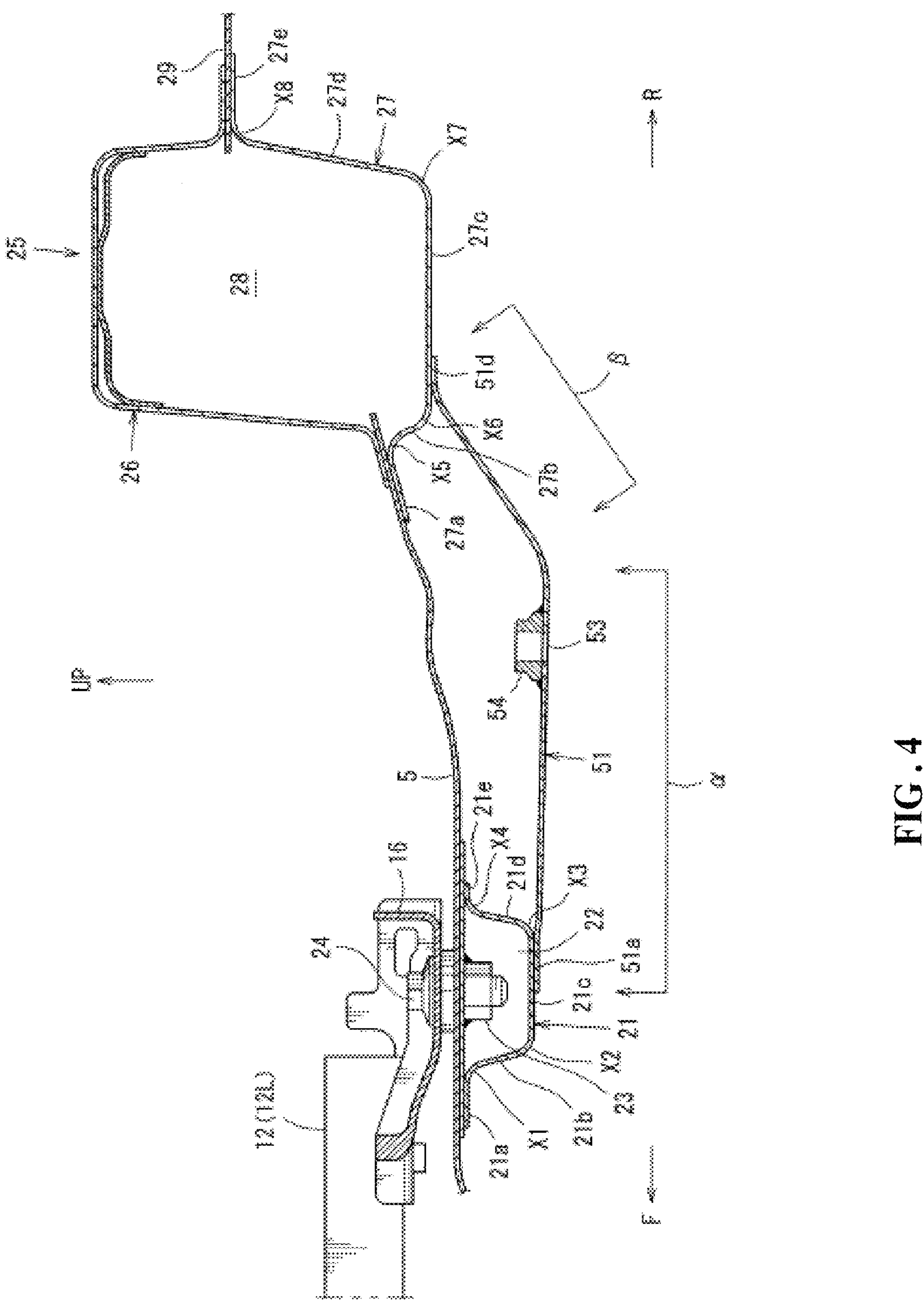
FIG. 4 is a cross-sectional view of essential parts, taken along line A-A of FIG. 1, as viewed in a direction indicated by arrows.

The drawings illustrate a lower body structure of a vehicle. FIG. 1 is a plan view of the lower body structure of the vehicle. FIG. 2 is a bottom view of FIG. 1. FIG. 3 is a bottom perspective view of the lower body structure of the vehicle. FIG. 4 is a cross-sectional view of essential parts, taken along line A-A of FIG. 1, as viewed in a direction indicated by arrows.

Figure 5:
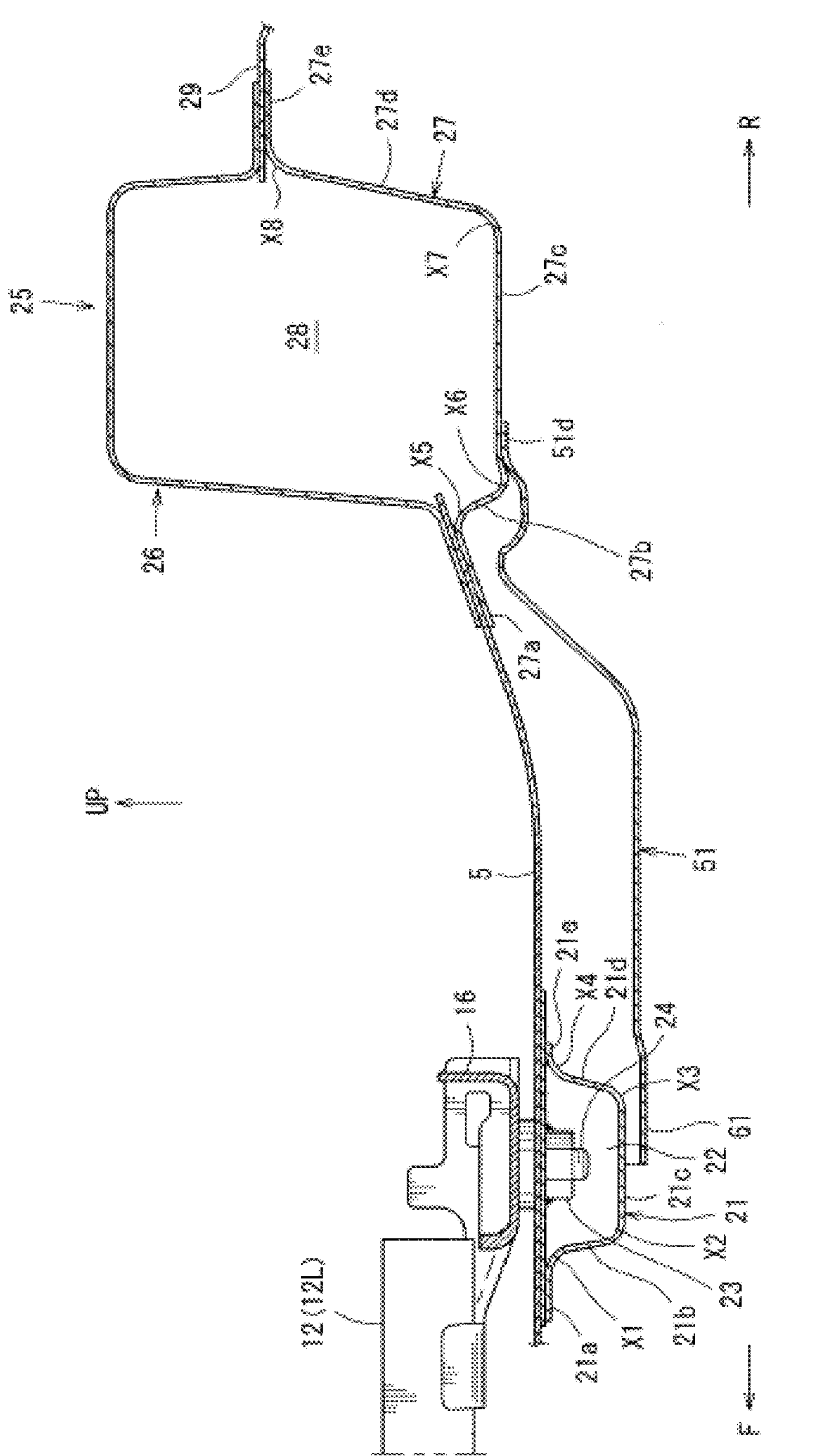
FIG. 5 is a cross-sectional view of essential parts, taken along line B-B of FIG. 1, as viewed in a direction indicated by arrows.
Figure 6:
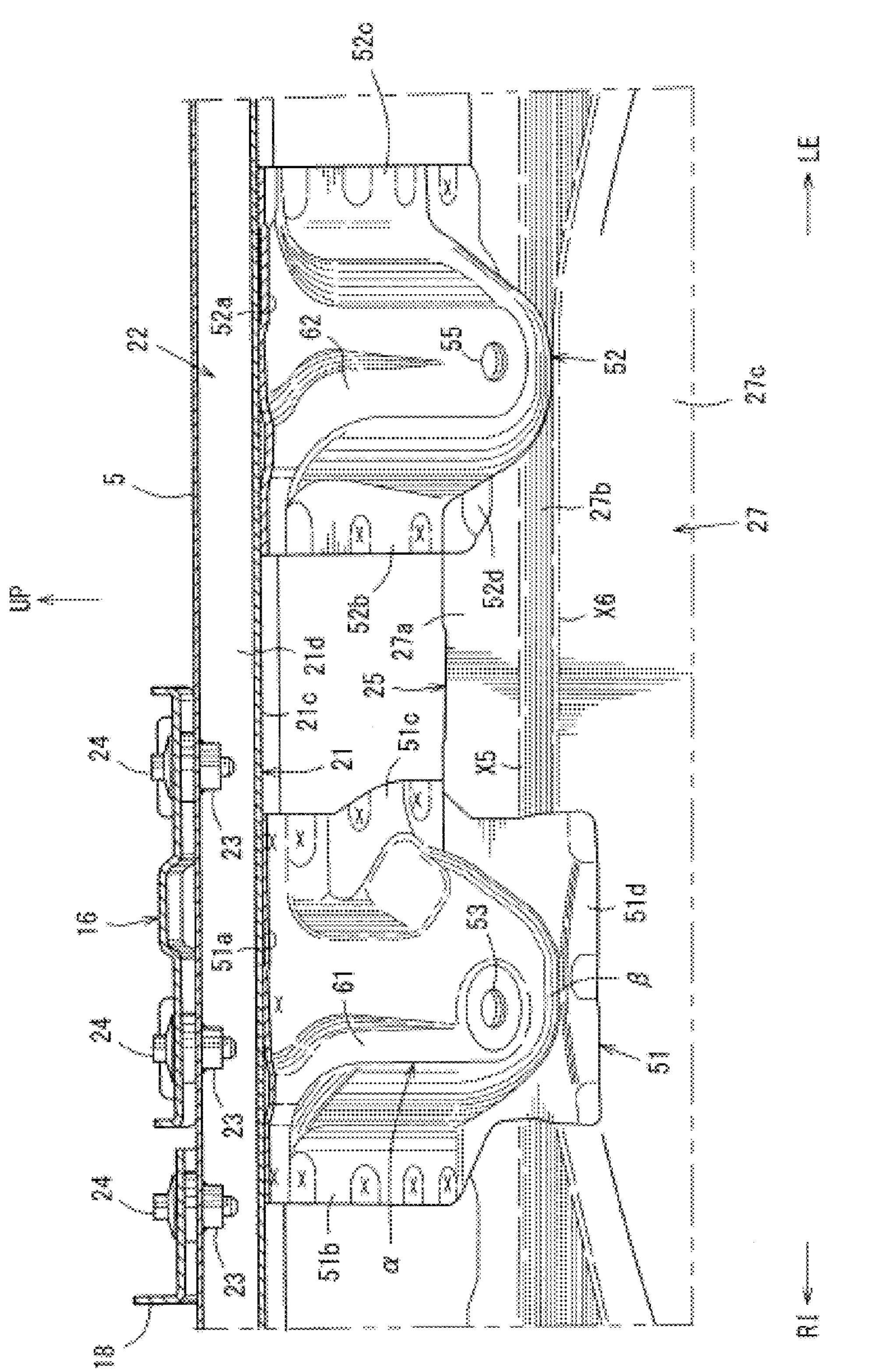
FIG. 6 is a cross-sectional view of essential parts, taken along line C-C of FIG. 1, as viewed in a direction indicated by arrows.
Figure 7:
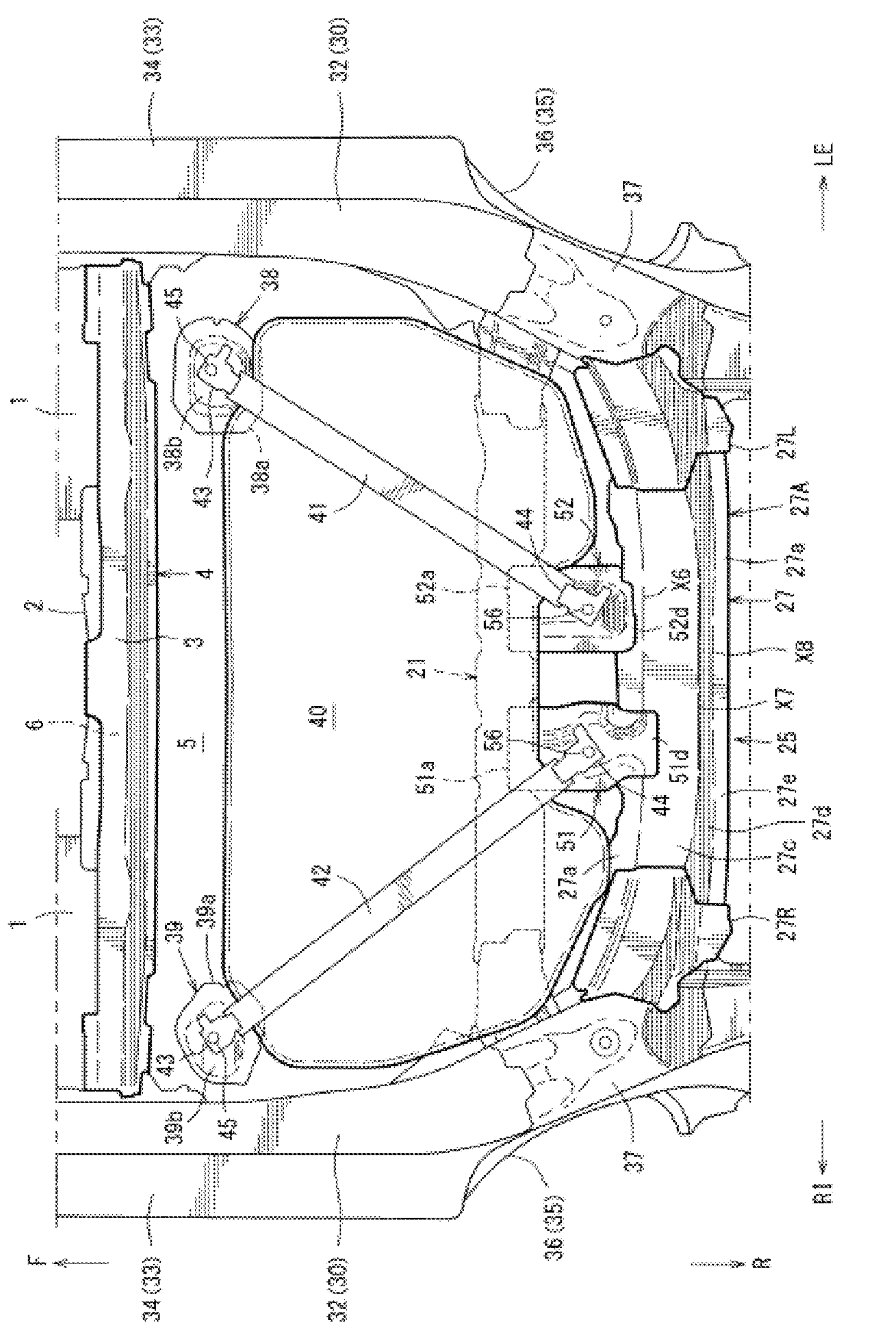
FIG. 7 is a bottom view illustrating a state in which a fuel tank is attached.
Figure 8:
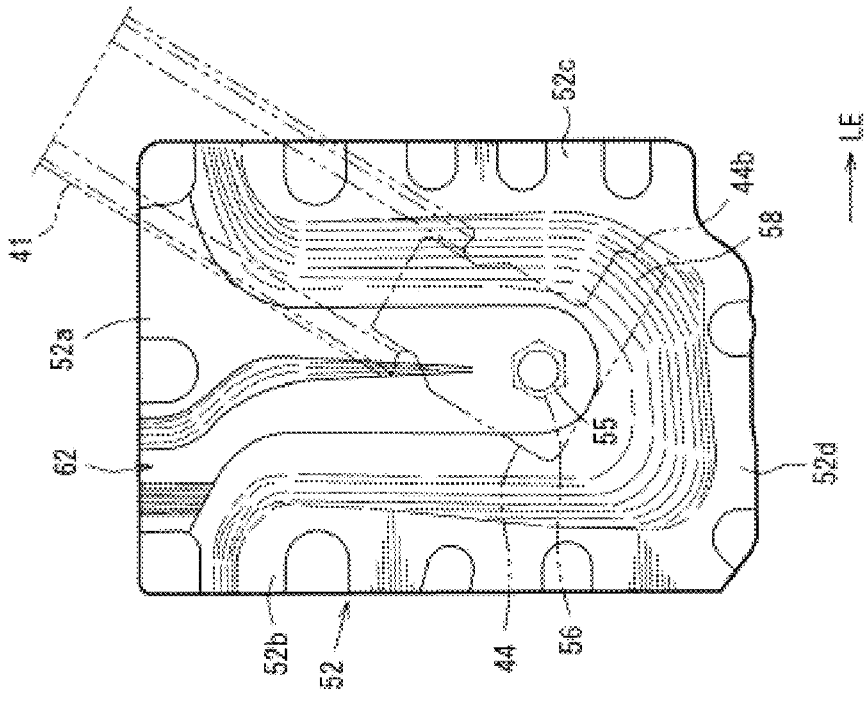
FIG. 8 is an enlarged bottom view of essential parts of FIG. 7.
Figure 8:
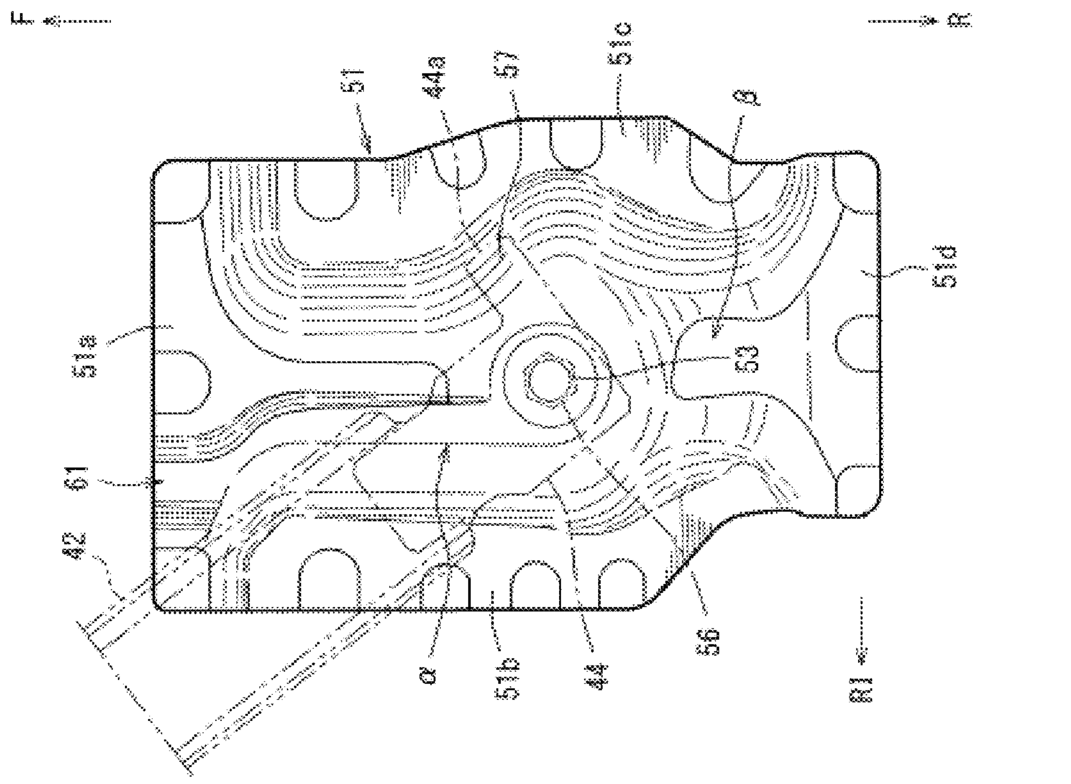

FIG. 5 is a cross-sectional view of essential parts, taken along line B-B of FIG. 1, as viewed in a direction indicated by arrows. FIG. 6 is a cross-sectional view of essential parts, taken along line C-C of FIG. 1, as viewed in a direction indicated by arrows. FIG. 7 is a bottom view illustrating a state in which a fuel tank is attached. FIG. 8 is an enlarged bottom view of essential parts of FIG. 7.

As illustrated in FIG. 1 to FIG. 3, a front floor panel 1 is provided as a floor panel that forms a floor of a vehicle cabin. In a central part of this front floor panel 1 in a vehicle width direction, a tunnel portion that protrudes into the vehicle cabin and extends in a fore-and-aft direction of the vehicle is formed. The tunnel portion may be integral to or separate from the front floor panel 1.

A first-row seat (a front seat including a driver's seat and a passenger's seat) is mounted above the front floor panel 1.

A rear seat pan 5 as a rear floor panel is disposed above a rear end portion of the front floor panel 1 via a cross member 4 (so-called No. 3 cross member) including a cross member upper 2 illustrated in FIG. 1 and a cross member lower 3 illustrated in FIG. 2.

The cross member 4 is a vehicle body strength member that includes the cross member upper 2 and the cross member lower 3 bonded and secured together, and that has a cross-member closed section 6 extending in the vehicle width direction.

As illustrated in FIG. 1, a second-row seat 7 (so-called rear seat) is mounted above the rear seat pan 5. That is, this lower body structure of the vehicle includes, from the vehicle front, the first-row seat and the second-row seat 7. The first-row seat is mounted above the front floor panel 1, and the second-row seat 7 is mounted above the rear seat pan 5.

Moreover, the second-row seat 7 is a divided seat divided into a left seat 8 and a right seat 9 at asymmetrical left and right positions; for example, these two seats 8 and 9 are divided at a length ratio of 6:4 in the vehicle width direction. Here, the left seat 8 and the right seat 9 each include a seat cushion that forms a seated surface by a rear-seat passenger, a seat back that forms a back rest surface for the rear-seat passenger, and a head rest that holds the head of the rear-seat passenger.

As illustrated in FIG. 1, a left and right pair of left seat rails 11 and a left and right pair of right seat rails 12 are provided in such a manner that the left seat 8 and the right seat 9 of the second-row seat 7 are independently slidable in the fore-and-aft direction of the vehicle.

As illustrated in FIG. 1, a front portion of a left rail 11L located on a left side of the left and right pair of left seat rails 11 in the vehicle width direction is secured to the cross member 4 via a rail support bracket 13. Moreover, a rear portion of the left rail 11L is secured to a first cross member 21, described later, via a rail support bracket 14.

As illustrated in the same drawing, a front portion of a right rail 11R located on a right side of the left and right pair of left seat rails 11 in the vehicle width direction is secured to the cross member 4 via a rail support bracket 15. Moreover, a rear portion of the right rail 11R is secured to the first cross member 21, described later, via a rail support bracket 16.

Similarly, as illustrated in FIG. 1, a front portion of a left rail 12L located on a left side of the left and right pair of right seat rails 12 in the vehicle width direction is secured to the cross member 4 via a rail support bracket 17. Moreover, a rear portion of the left rail 12L is secured to the first cross member 21, described later, via a rail support bracket 18.

As illustrated in the same drawing, a front portion of a right rail 12R located on a right side of the left and right pair of right seat rails 12 in the vehicle width direction is secured to the cross member 4 via a rail support bracket 19. Moreover, a rear portion of the right rail 12R is secured to the first cross member 21, described later, via a rail support bracket 20.

In short, the front portions of the left and right pair of left seat rails 11 and the left and right pair of right seat rails 12 are respectively secured to the cross member 4 via the rail support brackets 13, 15, 17, and 19, and the rear portions of the left and right pair of left seat rails 11 and the left and right pair of right seat rails 12 are respectively secured to the first cross member 21, described later, via the rail support brackets 14, 16, 18, and 20.

As illustrated in FIG. 1 and FIG. 2, opposed to positions of the rail support brackets 14, 16, 18, and 20 that secure the rear portions of the pair of left seat rails 11 and the pair of right seat rails 12, the first cross member 21 (so-called No. 3.5 cross member) extending in the vehicle width direction is disposed on a lower surface portion of the rear seat pan 5.

As illustrated in FIG. 4 and FIG. 5, the first cross member 21 includes a front flange portion 21*a*, a front surface portion 21*b*, a lower surface portion 21*c*, a rear surface portion 21*d*, and a rear flange portion 21*e*. Moreover, ridgelines X1, X2, X3, and X4 extending in the vehicle width direction are respectively formed between the front flange portion 21*a* and the front surface portion 21*b*, between the front surface portion 21*b* and the lower surface portion 21*c*, between the lower surface portion 21*c* and the rear surface portion 21*d*, and between the rear surface portion 21*d* and the rear flange portion 21*e*. Furthermore, a cross-member closed section 22 extending in the vehicle width direction is formed between the lower surface of the rear seat pan 5 and the first cross member 21.

Moreover, as illustrated in FIG. 2, the first cross member 21 includes the following three members integrated to extend in the vehicle width direction: an intermediate member 21A elongated in the vehicle width direction; a left side member 21L located on a left end in the vehicle width direction; and a right side member 21R located on a right end in the vehicle width direction.

Furthermore, as illustrated in FIG. 4, FIG. 5, and FIG. 6, each of the rail support brackets 14, 16, 18, and 20 is secured to a weld nut 23, which has been welded and secured in the cross-member closed section 22 of the first cross member 21 in advance, by a bolt 24 that tightens the weld nut 23 from an upper side.

As illustrated in FIG. 1 to FIG. 5, a second cross member 25 (so-called No. 4 cross member) is disposed on a rear end portion of the rear seat pan 5 and spaced rearward of the first cross member 21 in the vehicle fore-and-aft direction. The first cross member 21 and the second cross member 25 are adjacent to each other in the vehicle fore-and-aft direction.

As illustrated in FIG. 4 and FIG. 5, the second cross member 25 is a vehicle body strength member that includes a cross member upper 26 and a cross member lower 27, and in which the cross member upper 26 and the cross member lower 27 form a cross-member closed section 28 extending in the vehicle width direction.

As illustrated in FIG. 1, the cross member upper 26 includes the following three members integrated to extend in the vehicle width direction: an intermediate member 26A elongated in the vehicle width direction; a left side member 26L located on a left end in the vehicle width direction; and a right side member 26R located on a right end in the vehicle width direction.

As illustrated in FIG. 2 and FIG. 3, the cross member lower 27 includes the following three members integrated to extend in the vehicle width direction: an intermediate member 27A elongated in the vehicle width direction; a left side member 27L located on a left end in the vehicle width direction; and a right side member 27R located on a right end in the vehicle width direction.

As illustrated in FIG. 4 and FIG. 5, the cross member lower 27 of the second cross member 25 includes a front flange portion 27*a*, a front surface portion 27*b*, a lower surface portion 27*c*, a rear surface portion 27*d*, and a rear flange portion 27*e*. Moreover, ridgelines X5, X6, X7, and X8 extending in the vehicle width direction are respectively formed between the front flange portion 27*a* and the front surface portion 27*b*, between the front surface portion 27*b* and the lower surface portion 27*c*, between the lower surface portion 27*c* and the rear surface portion 27*d*, and between the rear surface portion 27*d* and the rear flange portion 27*e*.

As illustrated in FIG. 4 and FIG. 5, a compartment floor 29 as a floor panel is coupled to a rear portion of the second cross member 25 including the cross member upper 26 and the cross member lower 27. This compartment floor 29 constitutes a floor of a compartment.

Incidentally, as illustrated in FIG. 1 and FIG. 2, a rear side frame 30 extending in the fore-and-aft direction of the vehicle is disposed on each of left and right sides in the vehicle width direction of the rear seat pan 5 and the compartment floor 29.

This rear side frame 30 includes a rear side frame upper 31 illustrated in FIG. 1 and a rear side frame lower 32 illustrated in FIG. 2, and a rear side closed section extending in the fore-and-aft direction of the vehicle is formed between the rear side frame upper 31 and the rear side frame lower 32.

As illustrated in FIG. 1 and FIG. 2, the cross members, that is, the cross member 4 (so-called No. 3 cross member), the first cross member 21 (so-called No. 3.5 cross member), and the second cross member 25 (so-called No. 4 cross member) are provided to couple the left and right rear side frames 30 and 30 to each other in the vehicle width direction.

As illustrated in FIG. 1 and FIG. 2, a side sill 33 extending in the vehicle fore-and-aft direction is disposed from an outer side portion of each of the rear side frames 30 in the vehicle width direction that corresponds to an end portion of the first cross member 21 in the vehicle width direction, to a lower end portion of a hinge pillar at the vehicle front.

This side sill 33 is a vehicle body strength member that includes a side sill inner 34 and a side sill outer bonded and secured together, and that has a side-sill closed section extending in the fore-and-aft direction of the vehicle.

Moreover, as illustrated in FIG. 1 and FIG. 2, a rear wheelhouse 35 is disposed on a rear end portion of each of the side sills 33 and an outer side portion of the rear side frame 30 that is continuous from the rear end portion of the side sill 33. This rear wheelhouse 35 includes a wheelhouse inner 36 and a wheelhouse outer, and the rear wheelhouse 35 separately surrounds an upper half or more of a rear wheel.

Furthermore, as illustrated in FIG. 2 and FIG. 3, a subframe support bracket 37 for attaching a subframe is disposed on the rear side frame lower 32 corresponding to each end portion of the first cross member 21 in the vehicle width direction and each end portion of the second cross member 25 in the vehicle width direction.

Meanwhile, as illustrated in FIG. 2 and FIG. 3, a left and right pair of tank support brackets 38 and 39 are disposed immediately behind the cross member 4 and on the lower surface of the rear seat pan 5 on inner sides of the rear side frame lowers 32 in the vehicle width directions.

The tank support bracket 38 located on a left side in the vehicle width direction includes a flange portion 38*a*, and a bottom surface of a portion that protrudes downward into a bottomed cylindrical shape from the flange portion 38*a*, that is, an attachment surface 38*b*.

Similarly, the tank support bracket 39 located on a right side in the vehicle width direction includes a flange portion 39*a*, and a bottom surface of a portion that protrudes downward into a bottomed cylindrical shape from the flange portion 39*a*, that is, an attachment surface 39*b*. The attachment surfaces 38*b* and 39*b* are each made flat.

As illustrated in FIG. 7, in the case that a fuel tank 40 is disposed below the rear seat pan 5, this fuel tank 40 is attached and supported to the body with a left and right pair of tank bands 41 and 42. Tank band securing portions 43 and 44 are disposed on both of front and rear ends of the tank bands 41 and 42.

As illustrated in FIG. 7, of the left and right pair of tank bands 41 and 42, the left tank band 41 has a tank-band front end located on a left outer side in the vehicle width direction and has a tank-band rear end located on an inner side in the vehicle width direction.

Similarly, of the left and right pair of tank bands 41 and 42, the right tank band 42 has a tank-band front end located on a right outer side in the vehicle width direction and has a tank-band rear end located on an inner side in the vehicle width direction.

Then, the tank band securing portion 43 at the front end of the left tank band 41 is secured to the attachment surface 38*b* of the left tank support bracket 38 by a fastening member 45 such as a bolt. Similarly, the tank band securing portion 43 at the front end of the right tank band 42 is secured to the attachment surface 39*b* of the right tank support bracket 39 by the fastening member 45 such as a bolt.

Incidentally, as illustrated in FIG. 2 and FIG. 3, a first coupling member 51 that couples the first cross member 21 and the second cross member 25 to each other in the vehicle fore-and-aft direction is provided below the rear seat pan 5.

The first coupling member 51 is located between a securing portion located on a left side of the right seat rail 12 in the vehicle width direction, that is, the rail support bracket 18 of the left rail 12L, and a securing portion located on a right side of the left seat rail 11, that is, the rail support bracket 16 of the right rail 11R.

Specifically, the first coupling member 51 is located in a region of the vehicle width direction between a left end of the rail support bracket 16 at the rear of the right rail 11R in the vehicle width direction and a right end of the rail support bracket 18 at the rear of the left rail 12L in the vehicle width direction.

Thus, a portion where vibration input from the seat rails 11 and 12 of the second-row seat 7 is largest (a predetermined portion of the first cross member 21 to which the adjacent rail support brackets 16 and 18 are attached) is coupled to the second cross member 25 by the first coupling member 51, so that vibration from the second-row seat 7 is efficiently transmitted to the second cross member 25.

That is, without increasing the cost and mass, vertical vibration input to a cross member at a position of the seat rails of the second-row seat 7 (that is, the first cross member 21) is transmitted to an adjacent cross member (that is, the second cross member 25) so as to improve ride comfort.

As illustrated in FIG. 1, the second-row seat 7 is a divided seat in which the left and right seats 8, 9 are divided into asymmetrical left and right portions, for example, 6:4. As illustrated in FIG. 2, the first coupling member 51 is located on a right outer side of a vehicle-width-direction center CL of the vehicle in the vehicle width direction, and a second coupling member 52 is disposed at a position laterally symmetrical with the first coupling member 51 across the vehicle-width-direction center CL.

In other words, the first coupling member 51 is disposed at an offset position to the right of the vehicle-width-direction center CL, and the second coupling member 52 is disposed at an offset position to the left of the vehicle-width-direction center CL. Then, an offset amount of the first coupling member 51 from the vehicle-width-direction center CL is set to be equal to an offset amount of the second coupling member 52 from the vehicle-width-direction center CL.

Moreover, as illustrated in FIG. 1, the first coupling member 51 is provided to include a position opposed to a border between the seat cushion of the left seat 8 and the seat cushion of the right seat 9 that are divided at 6:4.

In a manner similar to the first coupling member 51, the second coupling member 52 couples the first cross member 21 and the second cross member 25 to each other in the vehicle fore-and-aft direction below the rear seat pan 5. Both of these first and second coupling members 51 and 52 are rigid members.

In this manner, the second coupling member 52 is disposed in lateral symmetry with the first coupling member 51 across the vehicle-width-direction center CL, so that load transmission routes are increased at the second coupling member 52, which results in rigidity improvement. Moreover, in a general mode of the seat rails of the second-row seat 7, vibration is transmitted most efficiently.

As illustrated in FIG. 6 and FIG. 8, the first coupling member 51 includes a front flange portion 51*a*, a right flange portion 51*b*, a left flange portion 51*c*, and a rear flange portion 51*d*. Then, the front flange portion 51*a* is bonded and secured to the first cross member 21, the left and right flange portions 51*c* and 51*b* are bonded and secured to the lower surface of the rear seat pan 5, and the rear flange portion 51*d* is bonded and secured to the lower surface portion 27*c* of the cross member lower 27 of the second cross member 25.

As illustrated in FIG. 3, the first coupling member 51 is formed in such a manner that a part where a tank attachment portion 53, described later, is disposed protrudes downward from the left and right flange portions 51*c* and 51*b*.

As illustrated in FIG. 6 and FIG. 8, the second coupling member 52 also includes a front flange portion 52*a*, a right flange portion 52*b*, a left flange portion 52*c*, and a rear flange portion 52*d*. Then, the front flange portion 52*a* is bonded and secured to the first cross member 21, the left and right flange portions 52*c* and 52*b* are bonded and secured to the lower surface of the rear seat pan 5, and the rear flange portion 52*d* is bonded and secured to the front flange portion 27*a* of the cross member lower 27 of the second cross member 25.

As illustrated in FIG. 3, the second coupling member 52 is formed in such a manner that a part where a tank attachment portion 55, described later, is disposed protrudes downward from the left and right flange portions 52*c* and 52*b*.

As illustrated in FIG. 4, the first coupling member 51 couples the lower surfaces of the first cross member 21 and the cross member lower 27 of the second cross member 25 to each other in the vehicle fore-and-aft direction.

Specifically, as illustrated in FIG. 4, the first coupling member 51 couples the lower surface portion 21*c* of the first cross member 21 and the lower surface portion 27*c* of the cross member lower 27 of the second cross member 25 to each other in the vehicle fore-and-aft direction. Thus, a load from the ridgeline X3 of the first cross member 21 is reliably transmitted to the ridgeline X6 of the cross member lower 27 of the second cross member 25 so as to disperse the load.

As illustrated in FIG. 6 and FIG. 8, the first coupling member 51 includes the tank attachment portion 53 for the fuel tank 40 (see FIG. 7). As illustrated in FIG. 4, this tank attachment portion 53 is formed at an opened portion, and a weld nut 54 is disposed on the tank attachment portion 53 of the first coupling member 51 so as to make the opened portion and a screw hole continuous.

As illustrated in FIG. 6 and FIG. 8, the second coupling member 52 also includes a tank attachment portion 55 for the fuel tank 40 (see FIG. 7). The tank attachment portion 55 is formed at an opened portion, and a weld nut is disposed on the tank attachment portion 55 of the second coupling member 52 so as to make the opened portion and a screw hole continuous.

Thus, the fuel tank 40 can be attached without need to provide additional tank attachment brackets.

Moreover, the structure is adaptable to variation. Specifically, in the case of a plug-in hybrid vehicle (so-called PHEV), the fuel tank 40 is small, and in this case, the respective tank attachment portions 53 and 55 of the first coupling member 51 and the second coupling member 52 may be made to support the fuel tank 40. Meanwhile, in the case of a vehicle driven by an internal combustion engine, the fuel tank 40 is large, and in this case, the second cross member 25 may be configured to support the fuel tank 40.

As illustrated in FIG. 7 and FIG. 8, the fuel tank 40 is attached to the tank attachment portions 53 and 55 with the left and right pair of tank bands 41 and 42. Specifically, the tank band securing portions 44 and 44 at the rear ends of the tank bands 41 and 42 are attached to the tank attachment portions 53 and 55 by fastening members 56, such as bolts, screwed into the weld nuts 54.

The tank band securing portion 44 on the tank band 42 side includes a protruding piece 44*a* that extends from a rear left side of the tank band securing portion 44 forward of the vehicle and leftward in the vehicle width direction and is thereafter bent to extend upward.

The tank band securing portion 44 on the tank band 41 side includes a protruding piece 44*b* that extends from a rear left side of the tank band securing portion 44 rearward of the vehicle and leftward in the vehicle width direction and is thereafter bent to extend upward.

As illustrated in FIG. 8, the first coupling member 51 includes, in the vicinity of the tank attachment portion 53, an inclined portion 57 that is inclined more inward in the vehicle width direction (more leftward in the vehicle width direction in this example) toward the rear so as to restrict rotation of the protruding piece 44*a* relative to the first coupling member 51.

As illustrated in the same drawing, the second coupling member 52 includes, in the vicinity of the tank attachment portion 55, an inclined portion 58 that is inclined more inward in the vehicle width direction (more rightward in the vehicle width direction in this example) toward the rear so as to restrict rotation of the protruding piece 44*b* relative to the second coupling member 52.

Thus, at the first coupling member 51 side, the inclined portion 57 restricts the protruding piece 44*a*, so that rotation of the tank band securing portion 44 can be stopped. Also, at the second coupling member 52 side, the inclined portion 58 restricts the protruding piece 44*b*, so that rotation of the tank band securing portion 44 can be stopped.

As illustrated in FIG. 4, the first coupling member 51 includes a first portion α extending in the vehicle fore-and-aft direction at a position flush with the lower surface portion 21*c* of the first cross member 21, and a second portion β extending rearward from a rear end of the first portion α.

Thus, as compared with a structure in which the first coupling member 51 directly couples the lower surfaces of the first cross member 21 and the cross member lower 27 of the second cross member 25 to each other linearly, the first coupling member 51 can be made to have a larger cross-sectional area so as to secure rigidity of the first coupling member 51.

As illustrated in FIG. 6 and FIG. 8, the first coupling member 51 includes a bead 61 protruding downward and extending in the vehicle fore-and-aft direction in the first portion α. Similarly, as illustrated in FIG. 6 and FIG. 8, the second coupling member 52 also includes a portion at a position flush with the lower surface of the first cross member 21, and includes a bead 62 protruding downward and extending in the vehicle fore-and-aft direction in this portion.

As illustrated in FIG. 6, a front end of each of these beads 61 and 62 is opened toward the vehicle front.

In this manner, the beads 61 and 62 are provided to secure rigidity of each of the coupling members 51 and 52, and the beads 61 and 62 protrude downward to function as drainage.

It is noted that in FIG. 1, reference numeral 63 denotes a brace member that couples an end portion of the second cross member 25 in the vehicle width direction and a body side panel including the wheelhouse inner 36 to each other.

It is also noted that in the drawing, arrow F indicates forward of the vehicle, arrow R indicates rearward of the vehicle, arrow LE indicates outward to the left in the vehicle width direction, arrow RI indicates outward to the right in the vehicle width direction, and arrow UP indicates upward of the vehicle.

As described above, the lower body structure of the vehicle according to this example is the lower body structure of the vehicle including the first-row seat and the second-row seat 7 from the front of the vehicle, and the lower body structure of the vehicle is characterized by: the left and right pair of left seat rails 11 and the left and right pair of right seat rails 12 configured to make the left and right seats (the left seat 8 and the right seat 9) of the second-row seat 7 independently slidable; the first cross member 21 including securing portions (see the rail support brackets 16 and 18) to which the left seat rails 11 and the right seat rails 12 are secured; the second cross member 25 disposed apart from the first cross member 21 in the vehicle fore-and-aft direction; and the first coupling member 51 that couples the first cross member 21 and the second cross member 25 to each other in the vehicle fore-and-aft direction, with the first coupling member 51 being located between the securing portion (the rail support bracket 18) located on the left side of the right seat rails 12 and the securing portion (the rail support bracket 16) located on the right side of the left seat rails 11 in the vehicle width direction (see FIG. 1 and FIG. 2).

With such a lower body structure of the vehicle, the portion where vibration input from the seat rails 11 and 12 of the second-row seat 7 is largest is coupled to the second cross member 25 by the first coupling member 51, so that vibration from the second-row seat 7 is efficiently transmitted to the second cross member 25.

That is, without increasing the cost and mass, vertical vibration input to the cross member at the position of the seat rails 11, 12 of the second-row seat 7 (that is, the first cross member 21) can be transmitted to the adjacent cross member (that is, the second cross member 25) so as to improve ride comfort.

Moreover, in the lower body structure of the vehicle, the second-row seat 7 is the divided seat divided into left and right seats (the left seat 8 and the right seat 9) at asymmetrical left and right positions, and the first coupling member 51 is located on the outer side of the vehicle-width-direction center CL in the vehicle width direction whereas the second coupling member 52 is disposed at the position laterally symmetrical with the first coupling member 51 across the vehicle-width-direction center CL (see FIG. 1 and FIG. 2).

With such a lower body structure of the vehicle, provision of the second coupling member 52 increases load transmission routes so that rigidity can be improved. Moreover, in a general mode of the seat rails 11 and 12 of the second-row seat 7, vibration can be transmitted most efficiently.

Furthermore, in the lower body structure of the vehicle, the first coupling member 51 couples the lower surfaces of the first cross member 21 and the second cross member 25 to each other in the vehicle fore-and-aft direction (see FIG. 4).

With such a lower body structure of the vehicle, the load from the ridgeline X3 of the first cross member 21 can be reliably transmitted to the ridgeline X6 of the second cross member 25 (more specifically, the cross member lower 27 of the second cross member 25) so as to disperse the load.

Furthermore, in the lower body structure of the vehicle, the first coupling member 51 includes the tank attachment portion 53 for the fuel tank 40 (see FIG. 2, FIG. 4, and FIG. 7).

With such a lower body structure of the vehicle, the fuel tank 40 can be attached without need to provide additional tank attachment brackets. Moreover, the structure is adaptable to variation. That is, in the case of a plug-in hybrid vehicle (plug-in hybrid electric vehicle; so-called PHEV), the fuel tank 40 is small, and in this case, the tank attachment portion 53 of the first coupling member 51 may be made to support the fuel tank 40. Meanwhile, in the case of a vehicle driven by an internal combustion engine, the fuel tank 40 is large, and in this case, the second cross member 25 may be made to support the fuel tank 40.

In addition, in the lower body structure of the vehicle, the fuel tank 40 is attached to the tank attachment portion 53 with the tank band 42, the tank band securing portion 44 located on the end of the tank band 42 includes the protruding piece 44*a* that is bent from the tank band securing portion 44 and extends upward, and the first coupling member 51 includes, in the vicinity of the tank attachment portion 53, the inclined portion 57 that is inclined more inward toward the rear or inclined more outward toward the rear (the former in this example) so as to restrict rotation of the protruding piece 44*a* relative to the first coupling member 51.

With such a lower body structure of the vehicle, the inclined portion 57 of the first coupling member 51 restricts the protruding piece 44*a*, so that rotation of the tank band securing portion 44 can be stopped.

Moreover, in the lower body structure of the vehicle, the first coupling member 51 includes the first portion α at the position flush with the lower surface portion 21*c* of the first cross member 21, and the second portion β extending from the rear end of the first portion α more upward toward the rear (see FIG. 4).

With such a lower body structure of the vehicle, as compared with the structure in which the first coupling member 51 directly couples the lower surfaces of the first cross member 21 and the second cross member 25 to each other, the first coupling member 51 can be made to have a larger cross-sectional area so as to secure rigidity of the first coupling member 51.

Furthermore, in the lower body structure of the vehicle, the first coupling member 51 includes the bead 61 protruding downward and extending in the vehicle fore-and-aft direction in the first portion α (see FIG. 6 and FIG. 8).

With such a lower body structure of the vehicle, provision of the bead 61 makes it possible to secure rigidity of the first coupling member 51, and also, the bead 61 protruding downward can function as drainage.

In correspondence between the configuration of the disclosure and the above-described example, the second-row seat of the disclosure corresponds to the second-row seat 7 of the example, the same applies as follows:

the left and right seats correspond to the left seat 8 and the right seat 9;

the left seat rails correspond to the left seat rails 11;

the right seat rails correspond to the right seat rails 12;

the securing portion located on the right side of the left seat rails corresponds to the rail support bracket 16;

the securing portion located on the left side of the right seat rails corresponds to the rail support bracket 18;

the first cross member corresponds to the first cross member 21 (so-called No. 3.5 cross member);

the second cross member corresponds to the second cross member 25 (so-called No. 4 cross member);

the fuel tank corresponds to the fuel tank 40;

the tank band corresponds to the tank band 42;

the tank band securing portion corresponds to the tank band securing portion 44;

the protruding piece corresponds to the protruding piece 44*a;* the first coupling member corresponds to the first coupling member 51;

the second coupling member corresponds to the second coupling member 52;

the tank attachment portion corresponds to the tank attachment portion 53;

the inclined portion corresponds to the inclined portion 57;

the bead corresponds to the bead 61;

the vehicle-width-direction center corresponds to the vehicle-width-direction center CL;

the first portion corresponds to the first portion α; and the second portion corresponds to the second portion β.

However, the disclosure is not limited to the configuration of the example alone, and many embodiments can be obtained.

INDUSTRIAL APPLICABILITY

As described above, the disclosure is effective when applied to the lower body structure of the vehicle including the first-row seat and the second-row seat from the vehicle front.

DESCRIPTION OF REFERENCE SIGNS AND NUMERALS

7: second-row seat
8: left seat
9: right seat
11: left seat rail
12: right seat rail
16: rail support bracket (securing portion located on the right side of the left seat rails)
18: rail support bracket (securing portion located on the left side of the right seat rails)
21: first cross member
25: second cross member
40: fuel tank
42: tank band
44: tank band securing portion
44*a*: protruding piece
51: first coupling member
52: second coupling member
53: tank attachment portion
57: inclined portion
61: bead
CL: vehicle-width-direction center
α: first portion
β: second portion

The invention claimed is:

1. A lower body structure of a vehicle including a first-row seat and a second-row seat from a front of the vehicle, the lower body structure comprising:

a left and right pair of left seat rails and a left and right pair of right seat rails configured to make left and right seats of the second-row seat independently slidable;

a first cross structure including securing portions to which the left seat rails and the right seat rails are secured;

a second cross structure disposed apart from the first cross structure in a vehicle fore-and-aft direction; and a first coupling structure that couples the first cross structure and the second cross structure to each other in the vehicle fore-and-aft direction, wherein the first coupling structure is located between the securing portion located on a left side of the right seat rails and the securing portion located on a right side of the left seat rails in a vehicle width direction, and wherein the first coupling structure is aligned, in the vehicle fore-and-aft direction, with the securing portion located on the left side of the right seat rails and the first coupling structure is aligned, in the vehicle fore-and-aft direction, with the securing portion located on the right side of the left seat rails.

2. The lower body structure of the vehicle according to claim 1, wherein the second-row seat is a divided seat divided into the left and right seats at asymmetrical left and right positions, wherein the first coupling structure is located on an outer side of a vehicle-width-direction center in the vehicle width direction, and wherein a second coupling structure is disposed at a position laterally symmetrical with the first coupling structure across the vehicle-width-direction center.

3. The lower body structure of the vehicle according to claim 1, wherein the first coupling structure couples lower surfaces of the first cross structure and the second cross structure to each other in the vehicle fore-and-aft direction.

4. The lower body structure of the vehicle according to claim 1, wherein the first coupling structure includes a tank attachment portion for a fuel tank.

5. The lower body structure of the vehicle according to claim 4, wherein the fuel tank is attached to the tank attachment portion with a tank band, wherein a tank band securing portion located on an end of the tank band includes a protruding piece that is bent from the tank band securing portion and extends upward, and wherein the first coupling structure includes, in a vicinity of the tank attachment portion, an inclined portion that is inclined more inward toward a rear or inclined more outward toward the rear so as to restrict rotation of the protruding piece relative to the first coupling structure.

6. The lower body structure of the vehicle according to claim 3, wherein the first coupling structure includes a first portion at a position flush with the lower surface of the first cross structure, and a second portion extending from a rear end of the first portion more upward toward a rear.

7. The lower body structure of the vehicle according to claim 6, wherein the first coupling structure includes a bead protruding downward and extending in the vehicle fore-and-aft direction in the first portion.

8. The lower body structure of the vehicle according to claim 2, wherein the first coupling structure couples lower surfaces of the first cross structure and the second cross structure to each other in the vehicle fore-and-aft direction.

9. The lower body structure of the vehicle according to claim 8, wherein the first coupling structure includes a tank attachment portion for a fuel tank.

10. The lower body structure of the vehicle according to claim 9, wherein the fuel tank is attached to the tank attachment portion with a tank band, wherein a tank band securing portion located on an end of the tank band includes a protruding piece that is bent from the tank band securing portion and extends upward, and wherein the first coupling structure includes, in a vicinity of the tank attachment portion, an inclined portion that is inclined more inward toward a rear or inclined more outward toward the rear so as to restrict rotation of the protruding piece relative to the first coupling structure.

11. The lower body structure of the vehicle according to claim 8, wherein the first coupling structure includes a first portion at a position flush with the lower surface of the first cross structure, and a second portion extending from a rear end of the first portion more upward toward a rear.

12. The lower body structure of the vehicle according to claim 11, wherein the first coupling structure includes a bead protruding downward and extending in the vehicle fore-and-aft direction in the first portion.

13. The lower body structure of the vehicle according to claim 2, wherein the first coupling structure includes a tank attachment portion for a fuel tank.

14. The lower body structure of the vehicle according to claim 13, wherein the fuel tank is attached to the tank attachment portion with a tank band, wherein a tank band securing portion located on an end of the tank band includes a protruding piece that is bent from the tank band securing portion and extends upward, and wherein the first coupling structure includes, in a vicinity of the tank attachment portion, an inclined portion that is inclined more inward toward a rear or inclined more outward toward the rear so as to restrict rotation of the protruding piece relative to the first coupling structure.

15. The lower body structure of the vehicle according to claim 3, wherein the first coupling structure includes a tank attachment portion for a fuel tank.

16. The lower body structure of the vehicle according to claim 15, wherein the fuel tank is attached to the tank attachment portion with a tank band, wherein a tank band securing portion located on an end of the tank band includes a protruding piece that is bent from the tank band securing portion and extends upward, and wherein the first coupling structure includes, in a vicinity of the tank attachment portion, an inclined portion that is inclined more inward toward a rear or inclined more outward toward the rear so as to restrict rotation of the protruding piece relative to the first coupling structure.

17. The lower body structure of the vehicle according to claim 3, wherein the first coupling structure is coupled to lower surfaces of the first cross structure directly below the securing portion that is located on the left side of the right seat rails and the other securing portion located on the right side of the left seat rails in the vertical direction of the vehicle body.

18. The lower body structure of the vehicle according to claim 8, wherein the first coupling structure is coupled to lower surfaces of the first cross structure directly below the securing portion that is located on the left side of the right seat rails and the other securing portion located on the right side of the left seat rails in the vertical direction of the vehicle body.

* * * * *